(12) United States Patent
Ludin et al.

(10) Patent No.: US 11,088,940 B2
(45) Date of Patent: Aug. 10, 2021

(54) COOPERATIVE MULTIPATH

(71) Applicant: Akamai Technologies, Inc., Cambridge, MA (US)

(72) Inventors: Stephen L. Ludin, Mill Valley, CA (US); Moritz M Steiner, San Francisco, CA (US); Martin T. Flack, San Francisco, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 38 days.

(21) Appl. No.: 15/913,367

(22) Filed: Mar. 6, 2018

(65) Prior Publication Data

US 2018/0262419 A1 Sep. 13, 2018

Related U.S. Application Data

(60) Provisional application No. 62/468,261, filed on Mar. 7, 2017.

(51) Int. Cl.
*H04L 12/707* (2013.01)
*H04L 29/12* (2006.01)
*H04L 29/06* (2006.01)
*H04L 29/08* (2006.01)

(52) U.S. Cl.
CPC .......... *H04L 45/24* (2013.01); *H04L 61/1511* (2013.01); *H04L 61/2007* (2013.01); *H04L 61/6077* (2013.01); *H04L 67/04* (2013.01); *H04L 69/161* (2013.01); *H04L 69/329* (2013.01); *H04L 69/14* (2013.01)

(58) Field of Classification Search
CPC . H04L 45/24; H04L 61/1511; H04L 61/2007; H04L 61/6077; H04L 67/04; H04L 69/14; H04L 69/161; H04L 69/329
See application file for complete search history.

(56) References Cited

U.S. PATENT DOCUMENTS

| | | | |
|---|---|---|---|
| 5,774,660 | A | 6/1998 | Brendel et al. |
| 6,108,703 | A | 8/2000 | Leighton et al. |
| 6,182,139 | B1 | 1/2001 | Brendel et al. |
| 6,243,761 | B1 | 6/2001 | Mogul et al. |
| 6,751,673 | B2 | 6/2004 | Shaw |
| 6,820,133 | B1 | 11/2004 | Grove et al. |
| 7,111,057 | B1 | 9/2006 | Wein et al. |

(Continued)

OTHER PUBLICATIONS

Screenshots of TCP Repair Overview, presentation given by Pavel Emelianov at Linux Plumber's Conference 2013, Sep. 18-20, 2013, New Orleans, Louisiana; video of presentation available at https://www.youtube.com/watch?v=lkH7p2jmxok.

(Continued)

*Primary Examiner* — Thomas J Dailey (57) ABSTRACT

Cooperative Multipath (referred to herein as 'CM') significantly improves upon the current state of the art for multipath HTTP and MP-TCP. In CM, a client application will discover and/or connect to N endpoints, over N different paths. Preferably these different paths go through different networks. Hence, each path may provide a unique communication channel, potentially with unique characteristics. A typical (but not limiting) case would be N=2, with the client application connecting over, for example, cellular interface to a first endpoint, and over WiFi to a second endpoint. Wireline interfaces may also be used.

14 Claims, 5 Drawing Sheets

(56) References Cited

U.S. PATENT DOCUMENTS

| | | | |
|---|---|---|---|
| 7,240,100 B1 | 7/2007 | Wein et al. | |
| 7,274,658 B2 | 9/2007 | Bornstein et al. | |
| 7,296,082 B2 | 11/2007 | Leighton et al. | |
| 7,299,291 B1 | 11/2007 | Shaw | |
| 7,376,716 B2 | 5/2008 | Dilley et al. | |
| 7,472,178 B2 | 12/2008 | Lisiecki et al. | |
| 7,581,158 B2 | 8/2009 | Alstrup et al. | |
| 7,596,619 B2 | 9/2009 | Leighton et al. | |
| 7,607,062 B2 | 10/2009 | Grove et al. | |
| 7,650,427 B1 | 1/2010 | Liu et al. | |
| 7,660,296 B2 | 2/2010 | Fletcher et al. | |
| 7,698,458 B1 | 4/2010 | Liu et al. | |
| 7,865,811 B2 | 1/2011 | Alstrup et al. | |
| 8,078,946 B2 | 12/2011 | Alstrup et al. | |
| 8,169,916 B1 | 5/2012 | Pai | |
| 8,176,203 B1 | 5/2012 | Liu et al. | |
| 8,332,484 B2 | 12/2012 | Afergan et al. | |
| 8,341,295 B1 | 12/2012 | Liu et al. | |
| 8,346,956 B2 | 1/2013 | Day et al. | |
| 8,473,635 B1 | 6/2013 | Lohner et al. | |
| 8,578,052 B1 | 11/2013 | Liu et al. | |
| 8,612,588 B1 | 12/2013 | Ehrlich et al. | |
| 8,688,817 B2 | 4/2014 | Hartrick et al. | |
| 8,819,280 B1 | 8/2014 | Liu et al. | |
| 8,875,287 B2 | 10/2014 | Ludin et al. | |
| 8,918,539 B2 | 12/2014 | Lohner et al. | |
| 8,996,646 B2 | 3/2015 | Alstrup et al. | |
| 9,137,492 B2 | 9/2015 | Lima et al. | |
| 9,398,505 B2 | 7/2016 | Greenwalt, III et al. | |
| 9,866,655 B2 | 1/2018 | Steiner et al. | |
| 2003/0002521 A1* | 1/2003 | Traversat | H04L 67/1046 370/465 |
| 2006/0218265 A1 | 9/2006 | Farber et al. | |
| 2007/0156845 A1 | 7/2007 | Devanneaux et al. | |
| 2008/0062879 A1 | 3/2008 | Sivakumar et al. | |
| 2008/0144504 A1 | 6/2008 | Marcondes et al. | |
| 2009/0254661 A1 | 10/2009 | Fullagar et al. | |
| 2010/0268789 A1 | 10/2010 | Yoo et al. | |
| 2010/0329248 A1 | 12/2010 | Eggert et al. | |
| 2010/0332595 A1 | 12/2010 | Fullagar et al. | |
| 2011/0173345 A1 | 7/2011 | Knox et al. | |
| 2011/0222404 A1 | 9/2011 | Watson et al. | |
| 2011/0296006 A1* | 12/2011 | Krishnaswamy | H04L 61/6077 709/224 |
| 2011/0314091 A1 | 12/2011 | Podjarny et al. | |
| 2012/0020284 A1 | 1/2012 | Haddad et al. | |
| 2012/0093150 A1 | 4/2012 | Kini et al. | |
| 2012/0144062 A1* | 6/2012 | Livet | H04L 45/24 709/239 |
| 2012/0150993 A1 | 6/2012 | Flack et al. | |
| 2012/0243441 A1 | 9/2012 | Reunamaki et al. | |
| 2012/0265853 A1 | 10/2012 | Knox et al. | |
| 2012/0320752 A1* | 12/2012 | Gouache | H04L 45/24 370/237 |
| 2012/0331160 A1 | 12/2012 | Tremblay et al. | |
| 2013/0031256 A1 | 1/2013 | Hampel et al. | |
| 2013/0086142 A1 | 4/2013 | Hampel et al. | |
| 2013/0111038 A1 | 5/2013 | Girard et al. | |
| 2013/0114481 A1 | 5/2013 | Kim et al. | |
| 2013/0195004 A1 | 8/2013 | Hampel et al. | |
| 2013/0318239 A1 | 11/2013 | Scharf et al. | |
| 2014/0047061 A1 | 2/2014 | Ehrlich et al. | |
| 2014/0059168 A1 | 2/2014 | Ponec et al. | |
| 2014/0101758 A1 | 4/2014 | Ludin et al. | |
| 2014/0156798 A1 | 6/2014 | Jasinskyj et al. | |
| 2014/0189069 A1 | 7/2014 | Gero et al. | |
| 2014/0269289 A1 | 9/2014 | Effros et al. | |
| 2014/0310735 A1 | 10/2014 | Brown et al. | |
| 2014/0362765 A1 | 12/2014 | Biswas et al. | |
| 2014/0379840 A1 | 12/2014 | Dao et al. | |
| 2015/0039713 A1 | 2/2015 | Martini | |
| 2015/0040221 A1 | 2/2015 | Mishra et al. | |
| 2015/0095502 A1 | 4/2015 | Le Bolzer et al. | |
| 2015/0106420 A1 | 4/2015 | Warfield et al. | |
| 2015/0106472 A1 | 4/2015 | Viveganandhan et al. | |
| 2015/0106578 A1 | 4/2015 | Warfield et al. | |
| 2015/0120821 A1 | 4/2015 | Bendell | |
| 2015/0121473 A1 | 4/2015 | Yang et al. | |
| 2015/0201046 A1 | 7/2015 | Biswas | |
| 2015/0271725 A1 | 9/2015 | Lee et al. | |
| 2015/0281331 A1 | 10/2015 | Steiner et al. | |
| 2015/0281367 A1 | 10/2015 | Nygren et al. | |
| 2015/0295728 A1 | 10/2015 | Kadel et al. | |
| 2015/0341705 A1 | 11/2015 | Brown et al. | |
| 2016/0330269 A1* | 11/2016 | Alstad | H04L 67/42 |
| 2018/0212883 A1* | 7/2018 | Wei | H04L 29/06 |

OTHER PUBLICATIONS

TCP Connection web page, available at www.criu.org/TCP_connection, accessed Mar. 31, 2015, last modified Feb. 26, 2015.

Transcript of TCP Repair Overview, presentation given by Pavel Emelianov at Linux Plumber's Conference 2013, Sep. 18-20, 2013, New Orleans, Louisiana; video of presentation available at https://www.youtube.com/watch?v=lkH7p2jmxok.

Andersen, et al., "Improving Web Availability for Clients with MONET, NSDI '05-Technical Paper, Proceedings of the 2nd Symposium on Networked Systems Design and Implementation," May 2005, 21 pages.

Bagnulo, "Threat Analysis for TCP Extensions for Multipath Operation with Multiple Addresses, IETF RFC 6181," Mar. 2011.

Bernaschi, et al., "SockMi: a solution for migrating TCP/IP connections", 15th EUROMIRCRO International Conference on Parallel, Distributed and Network-Based Processing, 2007 IEEE Publication. PDP '07. pp. 221-228.

Corbet, "TCP Connection Repair, LWN.net", May 1, 2012, available at https://lwn.net/Articles/495304/.

Deng, et al., "MPTCP Proxy for Mobile Networks," draft-deng-mptcp-mobile-network-proxy-00, MPTCP Working Group IETF, Informational Internet Draft, Feb. 14, 2014.

Deng, et al., "Use-cases and Requirements for MPTCP Proxy in ISP Networks," draft-deng-mptcp-proxy-00, MPTCP Working Group IETF, Informational Internet Draft, May 29, 2014.

Deng, et al., "Use-cases and Requirements for MPTCP Proxy in ISP Networks," draft-deng-mptcp-proxy-01, MPTCP Working Group IETF, Informational Internet Draft, Oct. 24, 2014.

Ford, "Architectural Guidelines for Multipath TCP Development," IETF RFC 6182, Mar. 2011.

Ford, "TCP Extensions for Multipath Operation with Multiple Addresses," IETF RFC 6824, Jan. 2013.

Higashi, "Topology-aware server selection method for dynamic parallel downloading," published in Consumer Communications and Networking Conference, IEEE conference held Jan. 2005, paper dated 2004, pp. 325-330.

Kim, et al., "Multi-Source Multi-Path HTTP (mHTTP): A Proposal," available at arvix.org (arXiv:1310.2748v1 [cs.NI]), Oct. 2013, 7 pages.

Kim, et al., "Multi-Source Multi-Path HTTP (mHTTP): A Proposal," available at arvix.org (arXiv:1310.2748v2 [cs.NI]) Dec. 9, 2013, 12 pages.

Livadariu, et al., "Leveraging the IPv4/IPv6 Identity Duality by using Multi-Path Transport" In Proceedings of the 18th IEEE Global Internet Symposium (GI). Hong Kong/People's Republic of China, 2015, https://www.simula.no/sites/www.simula.no/files/publications/files/gis2012 0.pdf (available online at least as early as Mar. 25, 2015).

Raiciu, "Coupled Congestion Control for Multipath Transport Protocols," IETF RFC 6356, Oct. 2011.

Scharf, "Multipath TCP (MPTCP) Application Interface Considerations," <draft-ietf-mptcp-api-07> IETF Internet draft, Jan. 19, 2013.

Scharf, "TCP (MPTCP) Application Interface Considerations," IETF RFC 6897, Mar. 2013.

Snoeren, et al., "TCP Connection Migration," <draft-snoeren-tcp-migrate-00.txt>, IETF Internet Draft Nov. 2000, 13 pages.

Snoeren, et al., "TCP Connection Migration," MIT Lab for Computer Science, Jun. 26, 2000, 12 pages.

(56) References Cited

OTHER PUBLICATIONS

Wei, et al., "MPTCP proxy mechanisms," draft-wei-mptcp-proxy-mechanism-00, IETF draft, Jun. 30, 2014.
Wei, et al., "MPTCP proxy mechanisms," draft-wei-mptcp-proxy-mechanism-01, IETF draft, Mar. 9, 2015.
U.S. Appl. No. 14/252,650.
U.S. Appl. No. 14/252,640, filed Apr. 14, 2014, Publication No. US-2015-0281331-A1 published on Oct. 1, 2015, 1 page.
U.S. Appl. No. 14/669,853, filed Mar. 26, 2015, Publication No. US-2015-0281367-A1 published on Oct. 1, 2015, 1 page.
Andersen, et al., Improving Web Availability for Clients with MONET, NSDI '05—Technical Paper, Proceedings of the 2nd Symposium on Networked Systems Design and Implementation, May 2-4, 2005, Boston MA, available at: http://static.usenix.org/events/nsdi05/tech/full_papers/andersen/andersen downloaded Oct. 30, 2013, 21 pages.
Belshe, et al., IETF, RFC 7540, Hypertext Transfer Protocol Version 2 (HTTP/2), May 2015, 96 pages. Also available at: https://www.rfc-editor.org/info/rfc7540.
Fette, et al., IETF, RFC 6455, The WebSocket Protocol, Dec. 2011, 71 pages. Also available at: https://www.rfc-editor.org/info/rfc6455.
Hamilton, et al., IETF, QUIC: A UDP-Based Secure and Reliable Transport for HTTP/2, Jul. 8, 2016, 36 pages. draft-hamilton-early-deployment-quic-00 Available at: https://datatracker.ietf.org/doc/active/.
Higashi, et al., Topology-aware Server Selection Method for Dynamic Parallel Downloading, 2004, IEEE, 6 pages. pp. 325-330.
Kim, et al., Multi-source Multipath HTTP (mHTTP): A Proposal, Dec. 10, 2013, 12 pages. Available at www.arXiv.org.
Nottingham, M. et al., RFC: 7838, Internet Engineering Task Force (IETF) HTTP Alternative Services, http://www.rfc-editor.org/info/rfc7838, Apr. 2016, 20 pages.
PCT/US2018/021194, International Search Report dated May 23, 2018, 5 pages.
PCT/US2018/021194, Written Opinion dated May 23, 2018, 5 pages.
Kim, et al., "Multi-source Multipath HTTP (mHTTP), ACM Sigmetrics Performance Evaluation Review", Association for Computing Machinery, New York, NY, US vol. 42, No. 1, Jun. 16, 2014, pp. 583-584, 2 pages.
Nicutar, Catalin et al., "Evolving the internet with connection acrobatics. Proceedings of the 2013 workshop on Hot topics middleboxes and network function virtualization, ACM, 2013."
European Patent Office, Rule 94(3) communication for Application No. 18 715 834.0, counterpart to instant application, dated Aug. 20, 2020, 6 pages.
Counterpart Application EP18715834.0, Art 94(3) communication of Aug. 20, 2020 (Exam report), 6 pages.
Applicant Response to Art 94(3) communication of Aug. 20, 2020, filed in counterpart EPO application 18 715834.0, dated Dec. 23, 2020, 16 pages.

\* cited by examiner

COOPERATIVE MULTIPATH

This patent application is a non-provisional of and claims the benefit of priority of U.S. Application No. 62/468,261, filed Mar. 7, 2017, the teachings of which are hereby incorporated by reference in their entirety and for all purposes.

BACKGROUND

Technical Field

This application relates generally to distributed data processing systems and to the delivery of content to users over computer networks.

Brief Description of the Related Art

Multipath HTTP is known in the art. In its current evolution, multipath HTTP (sometimes referred to as mHTTP) is a method of using multiple network paths to serve a requested object to a client. A client makes plural requests for the same object to a server over different paths. For example, a client can issue one request over a mobile device's WiFi network interface, and a second request over the client's cellular connection. Another network interface—wireline Ethernet for example—can also be used instead of, or in addition to, the WiFi and/or cellular interface. In general, any set of two or more requests that take different paths to a source of the same content can be used. Typically the term 'source' in this context is a server (e.g., origin server, proxy server). In one known variation, the client can connect to two or more servers (each over a different path), i.e., the first path being to a first server with a first replica, and the second path being to a second server with a second replica. Another known variation is to have the client connect to two or more servers over the same network interface. An example would be to have the client issue two HTTP requests over a cell network interface and thereby establish multipath HTTP.

More information about mHTTP and related topics can be found in US Patent Publication No. 2015-0281331, the teachings of which are hereby incorporated by reference for all purposes, and also in the following papers:

Kim et al., Multi-Source Multi-Path HTTP (mHTTP): A Proposal, available at arvix.org (arXiv:1310.2748v3 [cs.NI]) Dec. 10, 2013, 12 pages.

Higashi, Topology-aware server selection method for dynamic parallel downloading, published in Consumer Communications and Networking Conference, IEEE conference held January 2005, paper dated 2004, pages 325-330.

Andersen et al., Improving Web Availability for Clients with MONET, NSDI '05-Technical Paper, Proceedings of the 2nd Symposium on Networked Systems Design and Implementation, May 2005, 21 pages.

Multipath TCP is also known in the art. In general, multipath TCP involves setting up plural subflows as part of a single TCP connection. The subflows may travel over different paths. For example, TCP packets for one subflow could be sent from a WiFi interface, while TCP packets for second subflow are sent over a cellular interface. The packets in the various subflows are multiplexed back together at the receiver end. Multipath TCP works at the transport layer, on the byte-stream. Hence—and by design—multipath TCP endpoints know nothing about what the bytes represent to a layer 7 application. More information about multipath TCP and related topics can be found in US Patent Publication No. 2015-0281367, the teachings of which are hereby incorporated by reference for all purposes, and also in the following IETF documents:

A. Ford, Architectural Guidelines for Multipath TCP Development, IETF RFC 6182, March 2011

C. Raiciu, Coupled Congestion Control for Multipath Transport Protocols, IETF RFC 6356, October 2011

A. Ford, TCP Extensions for Multipath Operation with Multiple Addresses, IETF RFC 6824, January 2013

M. Scharf, Multipath TCP (MPTCP) Application Interface Considerations, IETF RFC 6897, March 2013

X. Wei et al., MPTCP proxy mechanisms, draft-wei-mptcp-proxy-mechanism-01, IETF draft, Mar. 9, 2015

L. Deng et al., Use-cases and Requirements for MPTCP Proxy in ISP Networks, draft-deng-mptcp-proxy-01, MPTCP Working Group IETF, Informational Internet Draft, Oct. 24, 2014

L. Deng et al., MPTCP Proxy for Mobile Networks, draft-deng-mptcp-mobile-network-proxy-00, MPTCP Working Group IETF, Informational Internet Draft, Feb. 14, 2014

With the foregoing by way of background, the details of nature, operation, and use of the invention are now described in detail.

SUMMARY

Cooperative Multipath (referred to herein as 'CM') significantly improves upon the current state of the art for multipath HTTP and MP-TCP. In CM, a client application will discover and/or connect to N endpoints, over N different paths. Preferably these different paths go through different networks. Hence, each path may provide a unique communication channel, potentially with unique characteristics. A typical (but not limiting) case would be N=2, with the client application connecting over, for example, cellular interface to a first endpoint, and over WiFi to a second endpoint. Wireline interfaces may also be used.

As those skilled in the art will recognize, the foregoing description merely refers to examples of the invention. There are many variations of the inventive teachings described herein. The claims alone define the scope of the invention for which protection is sought.

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the system, methods and apparatus disclosed herein. The systems, methods and apparatus described in this application and illustrated in the accompanying drawings are non-limiting examples; the claims alone define the scope of protection that is sought. The features described or illustrated in connection with one embodiment may be combined with the features of other embodiments. Such modifications and variations are intended to be included within the scope of the present invention. It should also be noted that the allocation of functions to particular machines is not limiting, as the functions recited herein may be combined or split amongst different machines in a variety of ways. All patents, patent application publications, other publications, and references cited anywhere in this document are expressly incorporated herein by reference in their entirety and for all purposes. The term "e.g.," used throughout is used as an abbreviation for the non-limiting phrase "for example."

Basic familiarity with well-known web, streaming, and networking technologies and terms, such as HTML, URL, XML, AJAX, CSS, MPEG, ABR, HTTP versions 1.1 and 2, TCP/IP, and UDP, is assumed. The term "server" is used herein to refer to hardware (a computer configured as a server, also referred to as a "server machine") with server software running on such hardware (e.g., a web server). Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software. It should be assumed that any communication path or connection described herein can be secured using known protocols, such as TLS or IPSec. For example, HTTP over TLS (and over UDP or TCP) is one implementation. QUIC with TLS 1.3 over UDP is another implementation. These are merely examples.

Introduction

Multipath HTTP and multipath TCP are methods of using multiple network paths to serve a requested object to a client, in order to improve response time. With the high variance in network and proxy conditions this can have a measurable effect on the median response time. It also can improve reliability due to redundancy.

Figure 1:
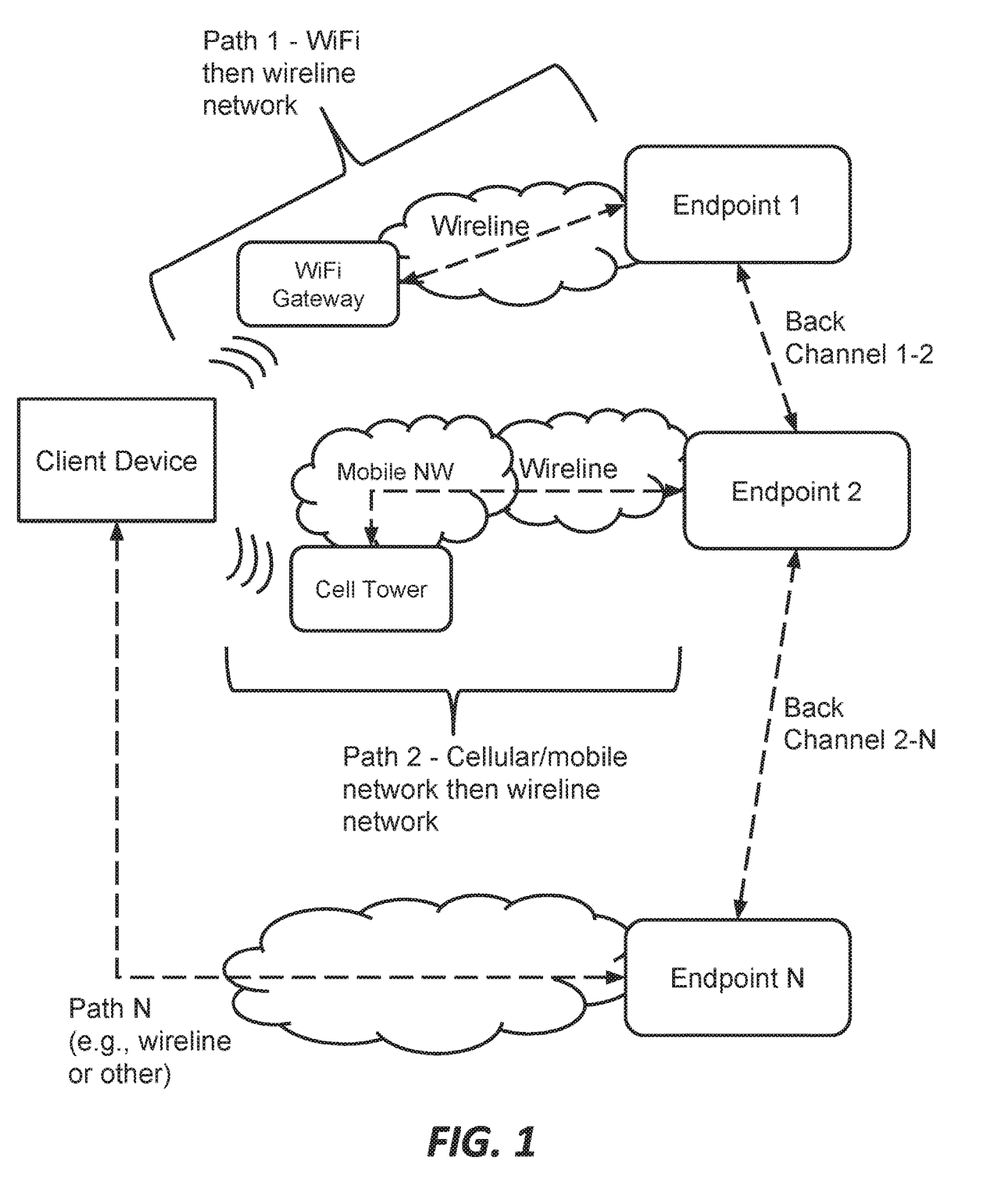
FIG. 1 is a diagram illustrating one embodiment of a cooperation multipath communication system.

Cooperative Multipath (referred to herein as 'CM') significantly improves upon the current state of the art for multipath HTTP and multipath TCP (MP-TCP). In CM, a client application can discover and/or connect to N endpoints, over N different paths. Preferably these different paths go through different networks. Hence, each path may provide a unique communication channel, potentially with unique characteristics. A typical case would be N=2, with the client connecting over cellular interface to a first endpoint, and over WiFi to a second endpoint. FIG. 1 shows an example, in which a client connects over WiFi+wireline (path 1) to endpoint 1; over cellular+wireline(path 2) to endpoint 2. FIG. 1 also illustrates the general case that a client may connect over over N paths to N endpoints. Note that the wireline networks shown in FIG. 1 could be same or different wireline networks on the Internet.

One of the paths might go through a mobile network, such as those known as 3G, 4G LTE, etc., while the other path may not. Typically the endpoints 1, 2 . . . N are servers and in one embodiment, the servers are part of a distributed computing system. An example of a suitable distributed computing system is a content delivery network, or CDN, that serves objects on behalf of a content provider. (See the description at the end of this document for more information about CDNs, CDN servers and delivery techniques, and CDN operation.) The backchannels are communication channels between the endpoints, and may be implemented using persistent (long-lived) TCP connections, tunnels, or Ethernet LAN connections (for example) if the endpoints are in the same data center), private high-performance protocols, or other techniques.

Figure 2:
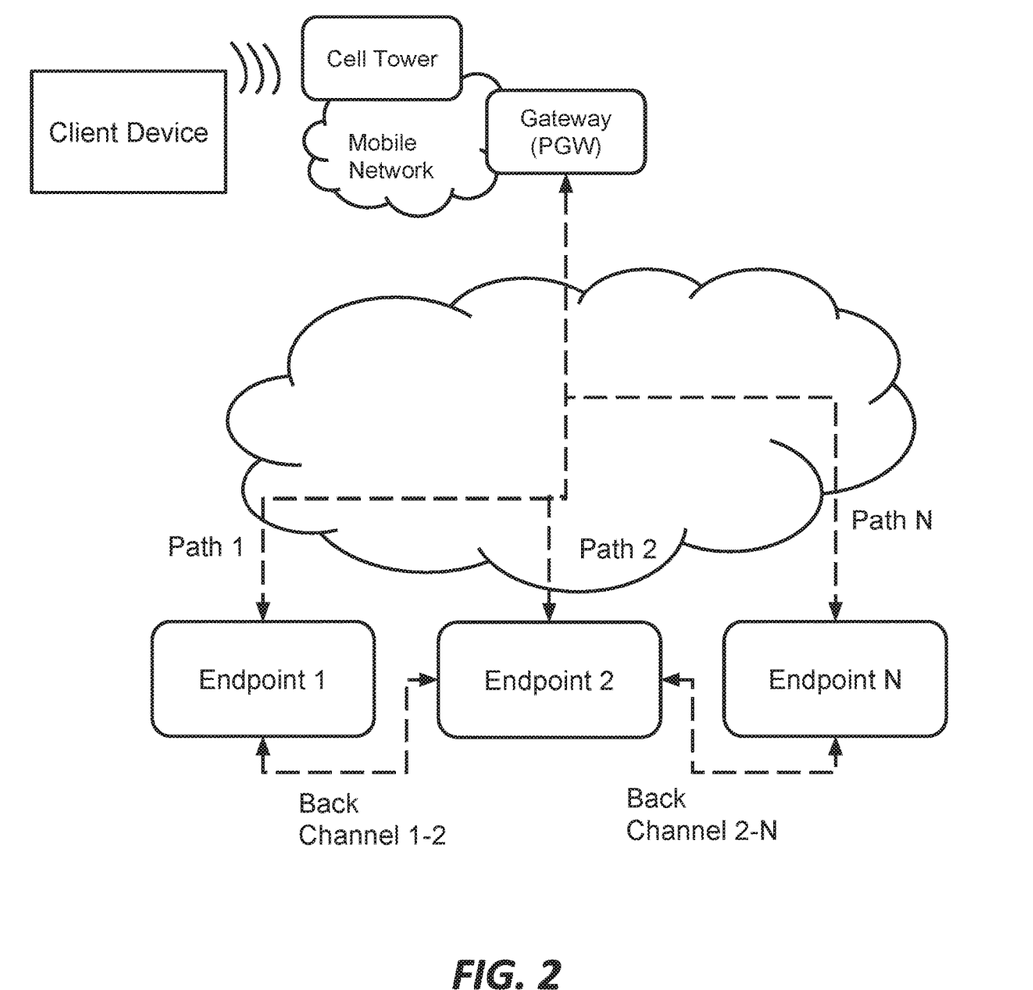
FIG. 2 is a diagram illustrating another embodiment of a cooperative multipath communication system.

In an alternate embodiment, shown in FIG. 2, the client uses a single interface, such as the cellular interface, and the N endpoints are outside the mobile network gateway (e.g., PGW element). As shown in FIG. 2, the paths are same until the gateway, after which they diverge on the public Internet.

After discovering, or after connecting to the N endpoints, the client informs each of the N endpoints of the existence and identity of the other endpoints. The client also informs at least the first endpoint, and in some implementations all N endpoints, about the network performance of its connection to each of the other endpoints. The client can send a variety of measurements, using network performance metrics as round trip time (RTT) to each endpoint, loss, latency, bandwidth, and connection type.

By informing each endpoint about the other endpoints, the client in effect creates a set of N cooperating endpoints that are aware of the client and each other, with each endpoint preferably (but not necessarily) having a unique path to the client. This arrangement can be used to facilitate improvements in communications and specifically in content delivery between the cooperating endpoints and the client. Two benefits of the CM system are: 1) resiliency: increased resilience to loss due to having established alternative connections if and when one connection breaks or experiences congestion. This is something that can be expected to happen frequently with wifi and cellular networks; and 2) performance: increased performance using the combined effective throughput of multiple network interfaces in a coordinated way. Note that these are potential benefits; achieving a specific benefit is not necessary for a system to be considered to be practicing the invention.

CM at the Application Layer: Use Cases

Preferably, CM is managed at the application layer, as that enables CM to have awareness of application layer objects. A well-known application layer protocol is HTTP, and many examples in this document use HTTP, but this not a limitation of the invention.

Object delivery using CM can be classified into one of two general cases.

The first case is where a client makes individual requests for objects. This includes delivery of videos, software downloads, or other large files. Typically, such files are broken up into segments that can be independently requested, or the files are otherwise addressable on a chunk by chunk basis. In the latter case, the client may use HTTP range requests to request individual byte ranges of the file.

Use Case 1. In the first case, CM can be used to deliver the object(s) from the endpoint that is best suited do so, because of the characteristics of the endpoint and/or the performance of that endpoint's communication channel with the client. For example, upon receiving a request for particular object, endpoint 1 can select itself or another endpoint to serve the requested object. The decisions can be based on the characteristics of the endpoints (their current load, role), and/or performance characteristics of the communication channel, and further in view of the size, type, and identity of the object. An endpoint with a relatively large TCP connection window size may be preferable to serve a large object, whereas an endpoint with a relatively small round trip time (RTT) may be preferable to server a smaller object, by way of illustration.

The second case is where a client makes a request for a first object that functions as a manifest and will lead to further object requests. An example is request for a markup language document, e.g., HTML. The markup language document is itself an object, but also typically includes embedded references to other objects to be used in constructing, e.g., a web page presentation.

Use Case 2. In the second case, CM can be used to prefetch, push, and otherwise accelerate the delivery of those objects on the manifest that the client is likely to need soon. As mentioned above, a primary example is delivery of a web page. Assume, for example, a client application sends an HTTP/2 request for a base HTML document to endpoint 1. Endpoint 1 knows that the client is also connected to endpoint 2.

Endpoint 1 may deliver the HTML in response to the request. However, it may also decide to instruct endpoint 2 to deliver some or all of the objects embedded in that HTML. This can be implemented using by having endpoint 1 notify the client that endpoint 2 will deliver the embedded objects, then having endpoint 1 send a message with a suitable instruction and content identifier endpoint 2 on backchannel 1-2 in FIG. 1. Endpoint 2 then can push the content to the client. In this way the client application is essentially receiving data over two communication channels, and in this case two radio networks. In some embodiments, the client application can be configured to send a HTTP/2 stream 'cancel' directive (e.g., an RST_STREAM frame with a CANCEL error code) if and when the client determines that it is receiving the same object over both, and that it could use the bandwidth more efficiently by canceling one.

Notwithstanding the foregoing examples, it should be understood that any kind of content can be delivered using CM techniques. This includes images, vector graphics, scripts, stylesheets, video, audio, data in JSON, XML or other format, virtual reality content, and others.

Details On Use Case 2 (Manifest object plus other objects)

Assume again that the client sends an HTTP request for a base HTML document to endpoint 1. Endpoint 1 can instruct endpoint 2 to deliver one or more objects embedded in the HTML document to the client application. In response, endpoint 2 can preemptively push the objects that the client application will need to construct the page defined by the HTML document, using HTTP/2 features for server push for example. And, this can occur while (in parallel) endpoint 1 delivers the HTML document to the client.

The decision to preemptively push an object, and the selection of which objects to push, can be made using any of the multitude of prefetching techniques known in the art. For example, see US Patent Publications No. 2014/0379840 and US 2015/0120821 and 2007/0156845, the teachings of all of which are hereby incorporated by reference for all purposes.

When endpoint 1 instructs another endpoint such as endpoint 2 to push content, it may take some time for endpoint 2 to receive and act upon this instruction; in the meantime, it may be advantageous for endpoint 1 to notify the client that a push is imminent and that a client may defer making a GET request for some time period. This notification action is potentially advantageous because, in general, when a client receives a document (HTML, JSON, XML etc) that references other resources (described e.g. by a URL) the client may request copies of those resources of which it does not have access to a valid cached copy. A push notification from a server indicates to a client that a request is not necessary, as the server will put some of that content in transmission expecting it to be useful to the client.

Hence, in accord with the teachings hereof, a notification from endpoint 1 can be sent just as a push notification would ordinarily occur, notwithstanding that an alternate endpoint will push the referenced content rather than endpoint 1. Delegating a push to another endpoint takes some time—e.g. endpoint 1 needs to contact endpoint 2. The notification from endpoint 1 to the client mitigates this time delay and also informs the client that the content will be arriving on an alternate connection at the client.

One way to do this is to leverage frames specified in HTTP/2. An HTTP/2 PUSH_PROMISE frame delivers an HTTP request (as in the style of a client) from server to client and thus may contain HTTP headers. According to the teachings hereof, the endpoint 1 server may leverage the headers to communicate some server-to-client information, one of which may be the aforementioned indication that the promised content will actually be delivered from endpoint 2. Hence endpoint 1 would send a PUSH_PROMISE frame with a header, e.g. "X-Cooperative-Multipath-Push: delegated 2" where 2 is the appropriate identifier for endpoint 2. The client could then respond with a cursory cancellation to the PUSH_PROMISE frame from endpoint 1 using an RST_STREAM frame with error code CANCEL. Asynchronously, endpoint 2, after receiving notification from endpoint 1, could issue a PUSH_PROMISE frame to the client, this time without a special header, and followed on the same socket with the appropriate content in accordance with HTTP/2. To handle some failure cases, if a push is not received from endpoint 2 within a reasonable timeout (e.g., six seconds), the client could seek to effectuate the push promise from endpoint 1 by issuing to endpoint 2 (or to endpoint 1) a GET request for the same content described in the initial PUSH_PROMISE frame from endpoint 1.

Preferably, the above CM techniques are implemented using long-lived connections between the client and the endpoints, as known in the art with TCP, HTTP/2 (RFC 7540) or client/server tunnels. The technique can also work without long-lived connections or tunnels, but the performance benefits may be less significant due to the time needed to re-establish the connection or tunnel when the client intends to send a request.

CM and Authentication/Authorization

A content provider may require authentication and/or authorization of the client in order to receive some types of content. In such cases, both endpoints do an authentication and/or authorization check of the client to verify that that the client is allowed to get the object, per content provider configured rules. That may necessitate sending along the original client request headers that are relevant, or the whole client request, from one endpoint to a cooperating endpoint. Alternatively, endpoint 1 could send an authentication and/or authorization assertion to endpoint 2. In yet another embodiment, endpoint 1 could send an encryption key to endpoint 2 and a corresponding key to the client. The key could be sent to the client in a header, embedded in the body of a response, or in an extensible HTTP/2 frame, for example. Endpoint 2 then can encrypt the content that it needs to serve to the client. The client will only be able to decrypt it if it has the appropriate key from endpoint 1, implying that the endpoint 1 has authenticated and/or authorized the client to receive the content, thereby eliminating the need for endpoint 2 to do so.

Designation of Cooperating Endpoints

In some of examples described above, a client informed every endpoint N of the existence of the other endpoints. This is not necessary and not a limitation on the teachings hereof. Generalizing, given N endpoints which the client discovers and are available to use with CM, the client can create one or more sets of cooperating endpoints from the N endpoints (e.g, endpoint.1, endpoint.2 . . . endpoint.N). Each set can be designated as $S_1, S_2 \ldots S_i$. Each set $S_i$ can have a size $Z_S$ in terms of the number of endpoints. The client creates a given set $S_i$ of cooperating endpoints by notifying $Z_S$ endpoints of each other, where the $Z_S$ endpoints are selected from the N endpoints to which the client is connected or has discovered. Multiple sets of cooperating endpoints can be created, and a given endpoint may have membership of more than one set. However, in the simplest case, $Z_S=N$ and all endpoints are notified of each other and become part of a single set of cooperative endpoints.

The client can notify an endpoint of their membership in a set S in a variety of ways, including sending that endpoint an identifier for the other endpoint(s), which identifier might be an IP address or a hostname with parameters encoded therein. The client can also send an identifier for the set S of cooperating endpoints to each endpoint in the set. Each endpoint can respond to this notification with an acknowledgement message. An endpoint may also respond to this notification with a cancellation of its membership in the cooperative scheme, for example if it is not permitted to participate in a cooperative scheme with one or more of the other endpoints listed, which may be driven by technical, communication, legal, or business reasons. One way to indicate cancellation would be to gracefully close the socket; in HTTP/2 this could involve sending a GOAWAY frame with a NO_ERROR error code and possibly a debug payload that could indicate that CM is unavailable with the chosen endpoints.

As noted earlier, as part of setting up the cooperating set of endpoints, preferably the client also informs at least the first endpoint, and in some implementations all N endpoints, about the network performance of its connection to each of the other endpoints. The client can send a variety of measurements, using network performance metrics as round trip time (RTT) to each endpoint, loss, latency, bandwidth, and connection type.

Factors that Influence Decision-Making Amongst Cooperating Endpoints

Having multiple connections over potentially multiple networks will by its nature increase capacity between the client and the servers is increased over having, relative to a single connection. Thus any use of that shared capacity will potentially show an improvement.

However, there are ways to further optimize the use of the available bandwidth for specific situations. Typically, endpoints will have different qualities of connections with the client. These connections will have different measured properties across a range of metrics such as for example, latency, bandwidth, loss, and connection type (e.g., wireline, wireless, narrowband, Wifi, Bluetooth, cellular). Measuring and tracking these properties for each connection will allow the servers to make decisions about what content should be served down which channel.

Depending on the use case, the server control plane can make choices to optimize usage of each connection, with a goal of minimizing time to deliver all objects (or at least all prioritized objects) A potential example for web page delivery could be as follows, with reference to FIGS. 1 and 2. If path 1 has substantially lower latency than path 2, page objects that have a higher rendering priority can be sent down path 1, while path 2 is used to deliver lower priority objects. Thus one channel (path 1) is used for a higher transactional rate and path 2 is higher throughput. Alternatively, both channels could be initially used for high priority objects and once a critical point is reached, the use of path 2 is changed such that path 2 is used to deliver lower priority, larger objects. The specifics of the decisions will vary based on use cases and provides an opportunity for optimization based on measured connection quality. These measurements may be real time or historical.

Another use case is the delivery of video objects. For example, a high latency low loss connection could be used for pushing video chunks (e.g., HTTP responses carrying video segments, or otherwise) and a low latency channel used for feedback and control. Generalizing, an object of a given type can be matched to, and delivered using, a connection that has measured properties most suitable for delivering that object type.

Client Discovery of Endpoints

The client can discover the N endpoints using a DNS lookup, proprietary directory request, static configuration, or other mechanism. In the case of a DNS lookup, the client application can query a DNS server to resolve a hostname associated with desired content, and the DNS server can respond with a single IP address, which the client application then uses to connect to all endpoints, but over different network interfaces. The endpoints may in fact be different due to anycasting or virtual IP and/or load balancing configurations on the server side. Alternatively, the DNS server can respond to the hostname resolution request by sending multiple (e.g., N) endpoint IP addresses, and the client can initiate connections over different network interfaces, using for each a different one of the IP address that it received. Yet another alternative is for the client to send multiple queries to the DNS system to resolve multiple hostnames (e.g., endpoint-1.foo.com, endpoint-2.foo.com, etc.), resulting in multiple DNS answers with IP addresses, and the client application can initiate connections using different IP addresses over different network interfaces.

Another way for the client to learn about the endpoints is to query the first endpoint. The first endpoint has more information about the client than a DNS server (e.g., the first endpoint likely has the client's actual IP address whereas the DNS server may have only the IP address of the recursive DNS server that the client uses). Therefore, the first endpoint may be able to provide more accurate or useful suggestions for additional endpoints to which the client can or should connect. Preferably, an endpoint has the ability to tell a client to disconnect from that endpoint and to connect to another endpoint instead. This could be accomplished, for example, using the HTTP Alternative Services mechanism defined in RFC 7838 (M. Nottingham, et al., IETF, April 2016)). This is useful for the operation of the CM system when network conditions might change or endpoints may become overloaded or need maintenance.

Client Connections to Endpoints

In the example described with respect to FIGS. 1-2, a client connected to multiple endpoints using different network interfaces (e.g., cellular and Wifi interfaces). In one notable embodiment, a client can connect to multiple endpoints over the same network interface, and then use cooperative multipath techniques described herein to notify the endpoints and manage the delivery of objects.

The term "connect" as used herein is meant to include, without limitation, a client device establishing a connection to a given endpoint using TCP, QUIC, or any other protocol that provides transmission control. (For more information QUIC, see IETF's QUIC: A UDP-Based Secure and Reliable Transport for HTTP/2 draft-hamilton-early-deployment-quic-00 application layer protocols; see IETF RFC6455 The WebSocket Protocol).

Also possible are long-lived connections of other types, including client-server tunnels, and connections using SPROUT, IP over UDP, WebSocket protocol or a VPN protocol.

The connection can be secured using protocols such as TLS or IPSec. For example, HTTP.x over TLS (and over UDP or TCP) is one implementation. QUIC with TLS 1.3 over UDP is another possible implementation approach.

Preferably, the client application communicates with the given endpoint using an application layer protocol such as HTTP/2 over a persistent TCP connection. This is referred to as an HTTP/2 connection. Preferably there is an HTTP/2 framing layer, and on top of that the HTTP/2 requests.

HTTP 1.1 over a transport layer connection also can be used, but the lack of a push mechanism makes this less preferred. In some cases, HTTP 1.1 might be used with a mechanism to enable endpoint 1 to tell the client to fetch a particular object from endpoint 2 (since endpoint 2 cannot push it).

Such an HTTP 1.1. scenario might look like the following, given a client requesting object X, and endpoints 1, 2:
1. Client requests X from endpoint 1;
2. Optional: endpoint 1 tells endpoint 2 directly to prepare part of X;
3. Response from endpoint 1 includes part of X and a hint to fetch part of the answer (i.e., part of X) from endpoint 2; and,
4. Client asynchronously requests part of X from endpoint 2.

In comparison, an HTTP/2 scenario might look like this, similar to that already described previously in the document:
1. Client requests X from endpoint 1;
2. Endpoint 1 tells endpoint 2 directly to send part of X;
3. Response from endpoint 1 is part of X (possibly preceded by a promise for the remaining part of X from endpoint 2 as described above); and
4. Client receives an HTTP/2 PUSH from endpoint 2 with the other part of X.

The second scenario above using HTTP/2 is likely to provide a faster response to the client, because a message from endpoint 1 to endpoint 2 (followed by a push from endpoint 2 to client) is likely to be faster than a message from endpoint 1 through client to endpoint 2 (requesting the same file). In fact, endpoint 1 and 2 may enjoy a persistent connection.

Example Use Cases

There are a variety of uses for leveraging and extending the techniques described above. In the following examples, the N cooperating endpoints are N servers that can serve a requested object (e.g., a web object) to a requesting client application, such that there are N channels overs N paths between client and endpoints. The client application can be a web browser or app hosted on a client device, modified in accordance with the teachings hereof.

a. Providing higher reliability and redundancy by the servers delivering the same object over both the communication channels.

b. Optimizing and/or balancing the number of bytes delivered over each channel (e.g., the cell channel or the WiFi channel or the wireline channel) based on the measured capabilities of each (e.g., bandwidth, round trip time, loss, etc). Besides channel capacity, cost to the end-user and/or the service provider can influence the optimization decision. For example, typically a cellular link is metered and charged to the end user according to a data plan, while a WiFi link is not metered and thus may be preferable.

c. Using one of the paths as an "out-of-band" communication channel to detect content tampering by using it to return digests of the objects being served to the client over the "primary" channel. For example, endpoint 1 delivers an object to the client application and synchronously sends a digest (e.g., MD5 hash or SHA-1 of the object) to endpoint 2, with whom it has established a secure connection, the digest representing a fingerprint of the data. Then, endpoint 2 delivers the digest to the client over its connection and the client can use this to verify the authenticity of the object it received from endpoint 1.)

In this respect, the teachings hereof may be combined with the teachings of US Patent Publication No. US-2014/0189069-A1, which are hereby incorporated by reference for all purposes. That publication describes a mechanism for distinguishing between content that should be served through either a first delivery channel (such as origin to client) or second delivery channel (such as CDN proxy server to client). At a high level, methodology disclosed in that publication includes as follows: 1. A given HTML file (or other markup language file or web page object with embedded references) is translated at an origin server to include verification codes for 'child' objects that are referenced therein. The verification codes can be hashes that serve as fingerprints for the object. 2. A client application requests and receives the HTML for a page, either directly from origin or through a CDN. Once the HTML arrives at the client application, it requests the embedded objects with the hashes from the CDN (e.g., from a particular CDN server). 3. The CDN server attempts to get the object, preferably in a public way (e.g., no cookies used to fetch it, no attempt to authenticate to origin, and/or request made to public IP address, etc.). The CDN server provides the object if possible, or if not a failure code to indicate that it is not available. 4. If the object is available and received from the CDN server, the client application verifies it (using the hash) and, if correct, loads it in the page. Otherwise, the client goes back to the origin to obtain it.

The teachings hereof can be applied to the scenario just described from US Patent Publication No. US-2014/0189069-A1. For example, one server of the N cooperating endpoints can be the origin, and another server can be the CDN server.

d. Besides sending a digest of the object, the "out of band" endpoint could also send the fingerprint of a certificate over the out of band channel, to make sure there is not a man in the middle attack going on. The certificate can be an x.509 certificate used to authenticate the client or server in a TLS handshake.

e. Two cooperating servers can each deliver portions a file in a fine-tuned way, using so-called fountain codes. It is known the art to use fountain codes to generate chunks of information based on an original file and then send these chunks from a server to a client over a single channel, or to have the client reach out to peer devices to obtain chunks. The client notifies the server, or stops requesting chunks from peers, when it has received enough chunks to reconstruct the file. See, for examples, U.S. Pat. Nos. 7,581,158, 7,865,811, 8,078,946, and 8,996,646 and US Patent Publication Nos. 2015-0341705 A1, and 2014-0310735 A1, the teachings of all of which are hereby incorporated by reference for all purposes. According to the teachings hereof, cooperative multipath can be set up between the client and N servers, and then the servers can each deliver fountain coded chunks over their respective links. The servers can cooperate, including using real-time feedback on congestion for each of their respective links/paths, to tune the amount of contribution that each server will make to delivery of the file. Thus each server could deliver different amounts of chunks, if desired. The allocation could be defined by preset targets/configuration, they could drive by network or server load feedback, and the like. In another embodiment, the portions of the file could be defined by byte ranges, using the HTTP byte range request and response protocol.

Implementation with N=1 Endpoint

While the foregoing description has used plural endpoints N>1 for illustrative purposes, it should be clear to those skilled in the art that in some embodiments, N=1. Put another way, the endpoints 1, 2 . . . N described above and illustrated in the Figures can be replaced with a single endpoint. When N=1, the client device is establishing multiple connections to an endpoint with each connection over a different path. This scenario still offers the potential for improved reliability/redundancy and performance gains. The backchannels 1-2, 2-N in FIG. 1, across endpoints described above would not exist. Rather, the endpoint might establish a separate socket for each endpoint, and the handling application (e.g., the HTTP server application) can maintain a data structure that stores and tracks the sockets that are part of the multipath session with the given client device. In this way, the application can coordinate delivery over multiple paths.

Comparison to Multipath TCP

One significant difference between cooperative multipath (CM) and multipath TCP (MP-TCP) is that MP-TCP works at a byte-stream level (layer 4) and therefore the TCP layer that is scheduling the subflows know nothing about what those bytes represent, e.g. an object (layer 7). CM enables much smarter content delivery using layer 7 awareness. In particular, the priority, size, purpose and other information and characteristics about the layer 7 object can be taken into account. For example, multiple client application requests can be sent over one network channel '1' to server 1, but because the client device is also connected over channel '2' to server 2, the two servers can cooperatively determine which object to serve over which channel. Preferably these determinations can be based on the network channel characteristics (latency, bandwidth, cost) and on the availability of the requested object in their caches as well as based on other server metrics (such as CPU load and memory pressure). One could imagine sending objects critical for rendering a web page over the lower latency and more expensive channel of the two, but the large high-resolution images over the cheaper channel. One could even maximize the combined throughput of channels 1+2 by sending byte-ranges of large files over both channels at the same time.

Compared to MP-TCP, CM has benefits, particularly when used with HTTP as the application layer. HTTP is a well-understood layer. And, the synchronization between endpoints 1 and 2 connected to the client doesn't need to be as tightly managed as in MP-TCP. For example, the cooperating endpoints 1 and 2 might simply need to agree on which object gets served from which server, no need to agree on the sequence number of every TCP segment on the wire.

It should be understood that the foregoing are potential benefits that may be achieved in light of the teachings hereof, but it is not necessary to obtain such benefits in order to be practicing the invention.

Use for Internal Operations in Distributed Computer Network

Note that the teachings hereof are not limited to an end-user client requesting content from a server or other endpoint. The "client" can be any computer with appropriate client software/hardware in a distributed computing system that needs to request or send (e.g., HTTP post) data to another machine (the "endpoint") in the distributed computing system. Such a client may be connected to the N endpoints via wireline connections, but nevertheless have interfaces to multiple networks. For example, the client may be deployed at or connected to an internet peering point. The client can connect to one endpoint via a first network, and the second endpoint via a second network. These two networks may be associated, for example, with distinct autonomous system numbers (ASNs). Similarly, the client might be connected to one endpoint via a link to the public Internet, while being connected to another endpoint via a private link (e.g., private backbone, enterprise network, MPLS line, etc.). Internal operations include such thing as cache hierarchy lookups, communications with network storage, and communications with logging, billing, and monitoring subsystems.

Use in Content Delivery Networks

As noted above, the teachings hereof may be implemented in a system in which CDN servers represent one or more of the cooperating endpoints. A description of a CDN, as known in the art, is now provided. A CDN is a distributed computer system and it is can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent nodes that are located in mobile networks, in or adjacent enterprise-based private networks, or in any combination thereof.

Figure 3:
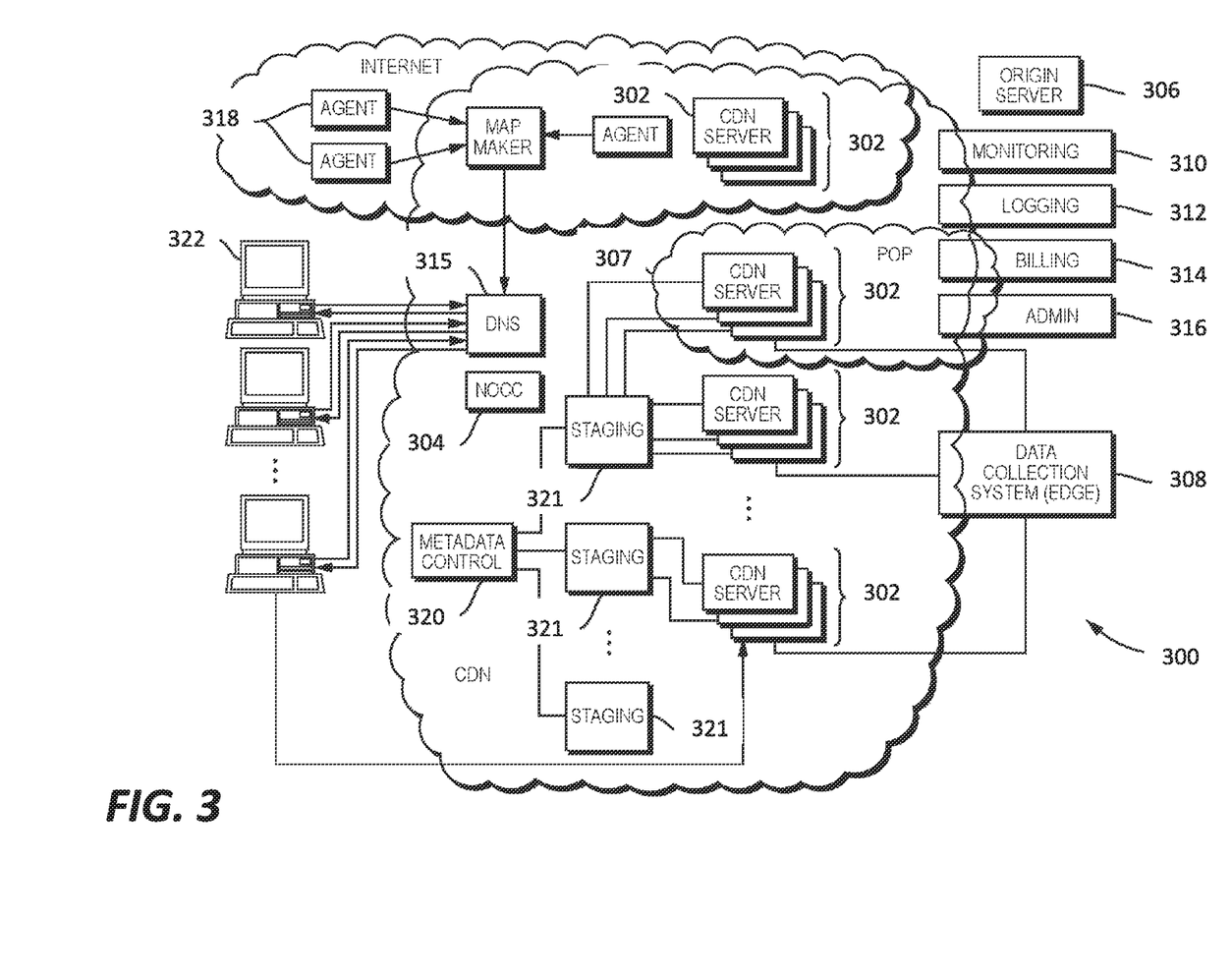
FIG. 3 is a diagram illustrating an embodiment of the content delivery network (CDN) in which the teachings hereof may be implemented.

In a known system such as that shown in FIG. 3, a distributed computer system 300 is configured as a content delivery network (CDN) and is assumed to have a set of machines 302 distributed around the Internet. Typically, most of the machines are configured as servers and located near the edge of the Internet, i.e., at or adjacent end user access networks. A network operations command center (NOCC) 304 may be used to administer and manage operations of the various machines in the system. Third party sites affiliated with content providers, such as web site 306, offload delivery of content (e.g., HTML or other markup language files, embedded page objects, streaming media, software downloads, and the like) to the distributed computer system 300 and, in particular, to the servers (which are sometimes referred to as content servers, or sometimes as "edge" servers in light of the possibility that they are near an "edge" of the Internet). Such servers may be grouped together into a point of presence (POP) 307.

Typically, content providers offload their content delivery by aliasing (e.g., by a DNS CNAME) given content provider domains or sub-domains to domains that are managed by the service provider's authoritative domain name service. End user client machines 322 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 3, the distributed computer system may also include other infrastructure, such as a distributed data collection system 308 that collects usage and other data from the CDN servers, aggregates that data across a region or set of regions, and passes that data to other back-end systems 310, 312, 314 and 316 to facilitate monitoring, logging, alerts, billing, management and other operational and administrative functions. Distributed network agents 318 monitor the network as well as the server loads and provide network, traffic and load data to a DNS query handling mechanism 315, which is authoritative for content domains being managed by the CDN. A distributed data transport mechanism 320 may be used to distribute control information (e.g., metadata to manage content, to facilitate load balancing, and the like) to the CDN servers.

A given machine in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy (sometimes referred to herein as a global host or "ghost") typically includes a manager process for managing a cache and delivery of content from the machine. For streaming media, the machine typically includes one or more media servers, as required by the supported media formats.

A given CDN server 302 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

Figure 4:
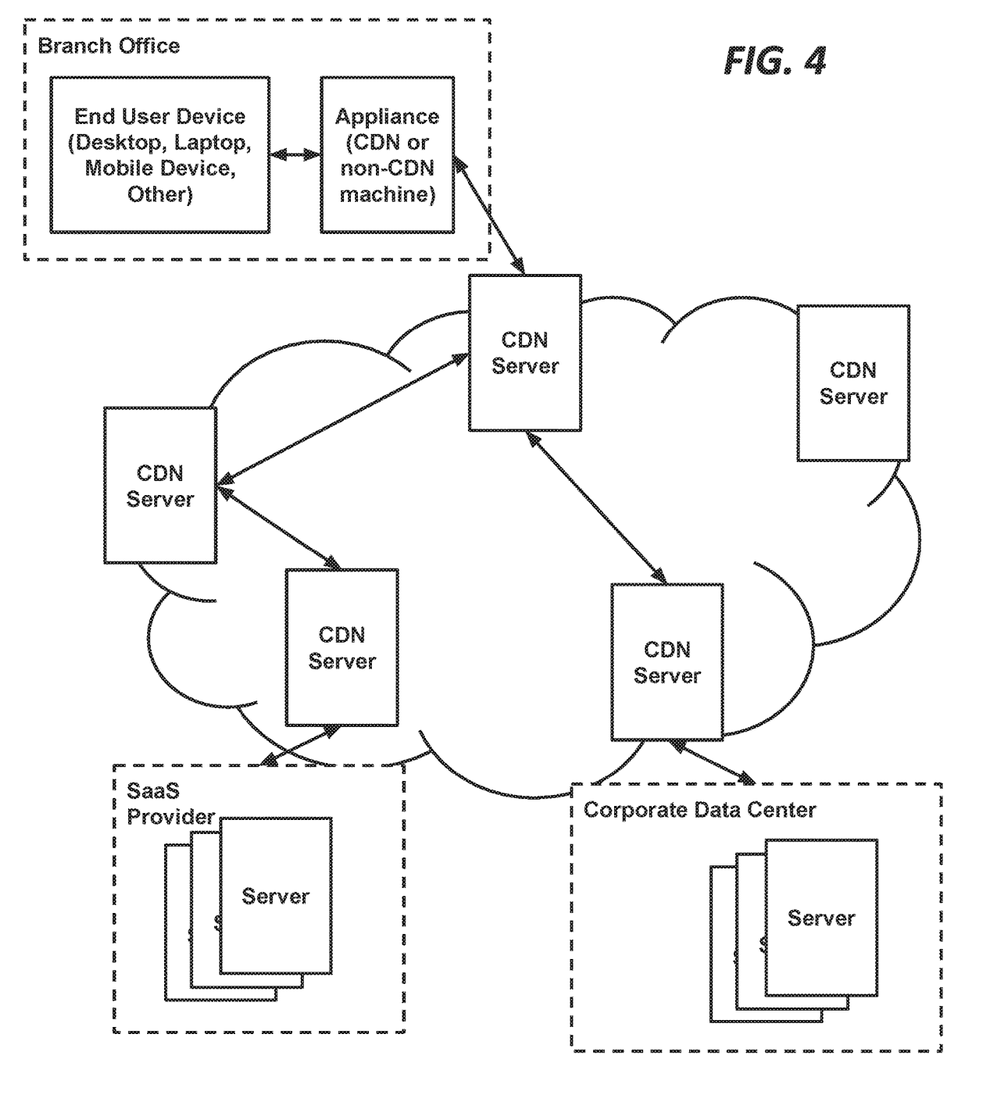
FIG. 4 is a diagram illustrating an embodiment of an optimized WAN. behind the firewall service provided by a CDN.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end. FIG. 4 illustrates a general architecture for the "behind-the-firewall" service offerings described above.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented with conventional computer systems, as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
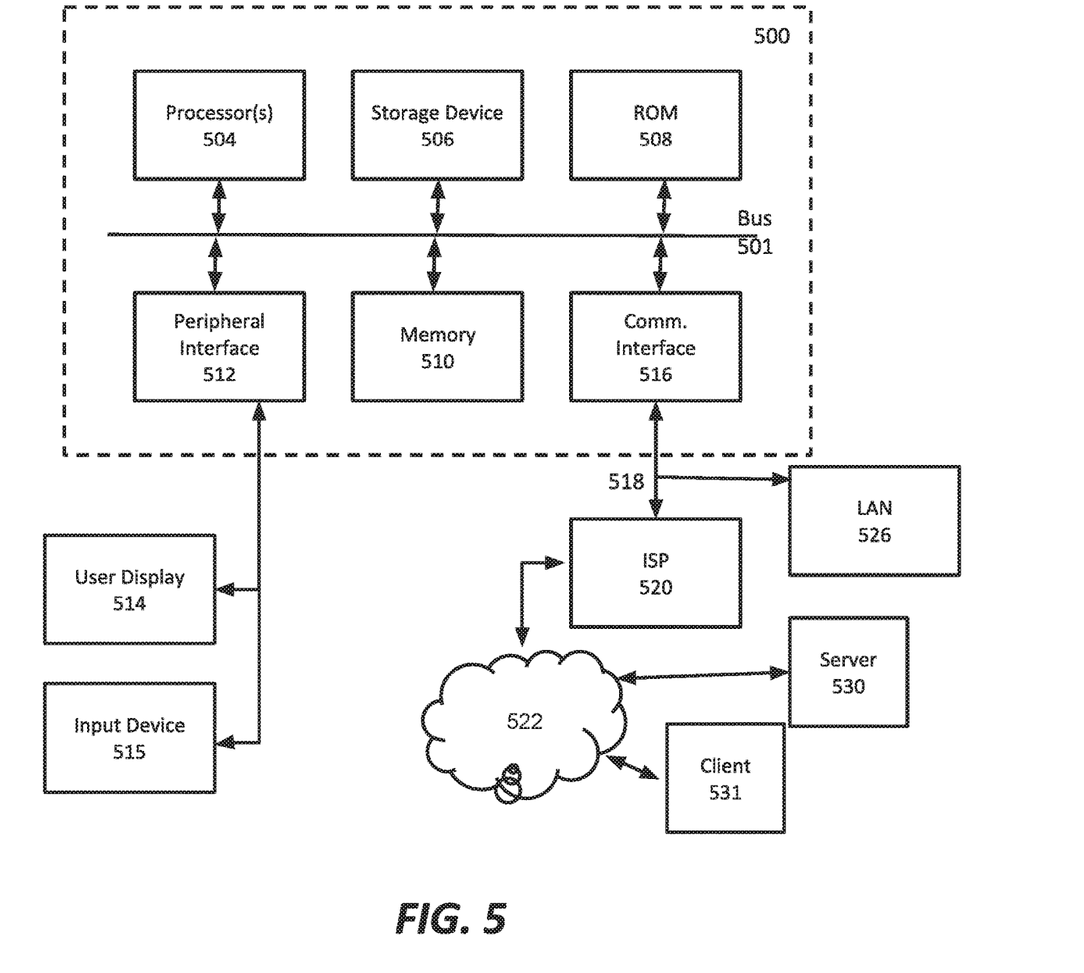
FIG. 5 is a block diagram illustrating hardware in a computer system that may be used to implement the teachings hereof.

FIG. 5 is a block diagram that illustrates hardware in a computer system 500 upon which such software may run in order to implement embodiments of the invention. The computer system 500 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 500 includes a microprocessor 504 coupled to bus 501. In some systems, multiple processor and/or processor cores may be employed. Computer system 500 further includes a main memory 510, such as a random access memory (RAM) or other storage device, coupled to the bus 401 for storing information and instructions to be executed by processor 504. A read only memory (ROM) 508 is coupled to the bus 401 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. The peripheral interface 512 may include interface circuitry, control and/or level-shifting logic for local buses such as RS-485, Universal Serial Bus (USB), IEEE 1394, or other communication links.

Computer system 500 is coupled to a communication interface 517 that provides a link (e.g., at a physical layer, data link layer, or otherwise) between the system bus 501 and an external communication link. The communication interface 516 provides a network link 518. The communication interface 516 may represent a Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 518 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The claims appearing in this application are considered part of its disclosure.

The invention claimed is:

1. A method for establishing and using a set of cooperating endpoints for multipath communication, the method comprising:

with a client device having first and second network interfaces:

establishing a first communication channel over the first network interface to a first endpoint, said first communication channel carrying application layer messages in accord with an application layer protocol running on top of a first transport layer connection;

establishing a second communication channel over the second network interface to a second endpoint, said second communication channel carrying application layer messages in accord with the application layer protocol running on top of a second transport layer connection;

after establishing the first and second communication channels, the client device designating a set of two or more cooperating endpoints so as to enable and cause the two or more cooperating endpoints to communicate with one another about each of the two or more cooperating endpoints serving content to the client device, the set of two or more cooperating endpoints including the first and second endpoints, the designation comprising one or more of: (i) the client device sending a message to the first endpoint that identifies the second endpoint, (ii) the client device sending a message to the second endpoint that identifies the first endpoint, and (iii) the client device sending a message to a remote host that identifies the first and second endpoints and instructs the remote host to notify both the first endpoint and the second endpoint of the designation;

and, responsive to the client device's designation of the set of two or more cooperating endpoints, the client device receiving a cancellation from at least one of the first and second endpoints, the cancellation effective to cancel membership of the at least one of the first and second endpoints in the set of two or more cooperating endpoints from which the cancellation was received.

2. The method of claim 1, wherein the first and second network interfaces are each of a type selected from the group consisting of: wifi network interface, cellular network interface, wireline network interface.

3. The method of claim 1, wherein the application layer protocol comprises HTTP/2.

4. The method of claim 1, wherein the first and second transport layer connections each comprise a TCP connection.

5. The method of claim 1, wherein the first communication channel is associated with a first path to the first endpoint, and the second communication channel is associated with a second path to the second endpoint, the first and second paths being different at least in part.

6. The method of claim 5, wherein the first path extends across a first network associated with a first telecommunications provider, and the second path extends across a second network associated with a second telecommunications provider.

7. The method of claim 1, wherein establishing the first communication channel from the first network interface of the client device to the first endpoint comprises sending one or more transport layer messages to an IP address, and wherein establishing the second communication channel from the second network interface of the client device to the second endpoint comprises sending one or more transport layer messages to the same IP address.

8. The method of claim 7, wherein the IP address is any of a virtual IP address and an Anycast IP address.

9. The method of claim 7, wherein prior to the steps recited in claim 7, the client device obtains the IP address from a DNS server in response to the client device making a DNS query for a content provider hostname to the DNS server.

10. The method of claim 1, wherein the first and second endpoints comprise any of: (a) first and second servers, respectively, (b) first and second proxy servers, respectively, (c) first and second CDN servers, respectively, and (d) first and second cache servers, respectively.

11. The method of claim 1, wherein, the client device any of: (i) sends the message to the first endpoint that identifies the second endpoint, over the first communication channel, (ii) sends the message to the second endpoint that identifies the first endpoint, over the second communication channel.

12. A cooperative multipath system, comprising:

a client device having first and second network interfaces and having circuitry forming at least one processor and memory storing instructions for execution on the at least one processor, the instructions comprising instructions for:

establishing a first communication channel over the first network interface to a first endpoint, said first communication channel carrying application layer messages in accord with an application layer protocol running on top of a first transport layer connection;

establishing a second communication channel over the second network interface to a second endpoint, said second communication channel carrying application layer messages in accord with the application layer protocol running on top of a second transport layer connection;

after establishing the first and second communication channels, the client device designating a set of two or more cooperating endpoints so as to enable and cause the two or more cooperating endpoints to communicate with one another about each of the two or more cooperating endpoints serving content to the client device, the set of two or more cooperating endpoints including the first and second endpoints, the designation comprising sending a message to the first endpoint that identifies the second endpoint;

the first endpoint having circuitry forming at least one processor and memory storing instructions for execution on the at least one processor, the instructions comprising instructions for:

in response to receipt of the message identifying the second endpoint and the client device's designation of the set of two or more cooperating endpoints, sending to the second endpoint one or more of:

(a) an instruction to serve an object to the client device, (b) an instruction to serve a portion of an object to the client device, and, (c) a key to use in encrypting information before transmission of the information to the client device;

and, the instructions stored in the memory of the client device further comprising instructions for:

responsive to the client device's designation of the set of two or more cooperating endpoints, the client device receiving a cancellation from at least one of the first and second endpoints, the cancellation effective to cancel membership of the at least one of the first and second endpoints in the set of two or more cooperating endpoints from which the cancellation was received.

13. The system of claim 12, wherein the first communication channel is associated with a first path to the first endpoint, and the second communication channel is associated with a second path to the second endpoint, the first and second paths being different at least in part.

14. The system of claim 13, wherein the first path extends across a first network associated with a first telecommunications provider, and the second path extends across a second network associated with a second telecommunications provider.

* * * * *